United States Patent
Hu et al.

(10) Patent No.: US 9,270,108 B2
(45) Date of Patent: Feb. 23, 2016

(54) PROTECTION CIRCUIT FOR BRUSHED DC MOTOR

(75) Inventors: Hui Hu, Zhongshan (CN); Hairong Sun, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 247 days.

(21) Appl. No.: 13/439,837

(22) Filed: Apr. 4, 2012

(65) Prior Publication Data

US 2012/0293895 A1 Nov. 22, 2012

Related U.S. Application Data

(63) Continuation-in-part of application No. PCT/CN2011/074149, filed on May 17, 2011.

(51) Int. Cl.
H02H 5/04 (2006.01)
H02H 7/08 (2006.01)

(52) U.S. Cl.
CPC .................... *H02H 7/0811* (2013.01)

(58) Field of Classification Search
CPC ........... H05B 41/2828; H05B 33/0884; Y02B 70/1475; Y02B 70/1441; H02M 3/33592; H02M 1/4208; H02M 3/33576; A47L 9/0411; A47L 9/2889; H02H 9/04; H02H 3/08; H02H 7/125; H02H 7/0811; A61N 1/08; H02P 7/292; H02P 29/00; H02P 29/0044; H02P 29/0088; H03K 17/0822; H04R 3/007; Y10S 388/903; G06F 1/26; H01M 10/486; F16F 15/03; F16F 2232/06; A61F 2/68; B01F 13/1063; F04C 2240/81; G01C 3/08; H02J 7/0029; H02K 11/0047; H02K 11/0073

USPC ................. 318/400.21, 400.22, 783, 400.16; 361/272, 534, 31
See application file for complete search history.

(56) References Cited

U.S. PATENT DOCUMENTS 3,936,711 A * 2/1976 Gay ...................... H02P 7/2885
388/816

FOREIGN PATENT DOCUMENTS

CN 101355330 A * 1/2009
JP 2009136054 A * 6/2009

* cited by examiner

Primary Examiner — Eduardo Colon Santana
Assistant Examiner — Iftekhar Mustafa
(74) Attorney, Agent, or Firm — Matthias Scholl, PC; Matthias Scholl (57) ABSTRACT

A protection circuit for brushed DC motors connected between an AC power supply input and a rectifier circuit, including a power supply line, a power supply circuit, an AC detection circuit, a rectifier/filter voltage-stabilizing circuit, a microprocessor, a drive circuit, and a switching unit. The switching unit is connected to the power supply line in series. An input terminal of the power supply circuit is connected with the AC power supply input. The AC detection circuit receives current signals from the power supply line. The current signals are processed by the rectifier/filter voltage-stabilizing circuit and sent to the microprocessor. An output terminal of the microprocessor is connected to an input terminal of the drive circuit, and the drive circuit controls the switching unit to connect or disconnect the power supply circuit.

7 Claims, 8 Drawing Sheets

PROTECTION CIRCUIT FOR BRUSHED DC MOTOR

CROSS-REFERENCE TO RELATED APPLICATIONS

This application is a continuation-in-part of International Patent Application No. PCT/CN2011/074149 with an international filing date of May 17, 2011, designating the United States, now pending. The contents of the aforementioned application, including any intervening amendments thereto, are incorporated herein by reference.

BACKGROUND OF THE INVENTION

1. Field of the Invention

The invention relates to a protection circuit for brushed DC motors.

2. Description of the Related Art

Figure 1:
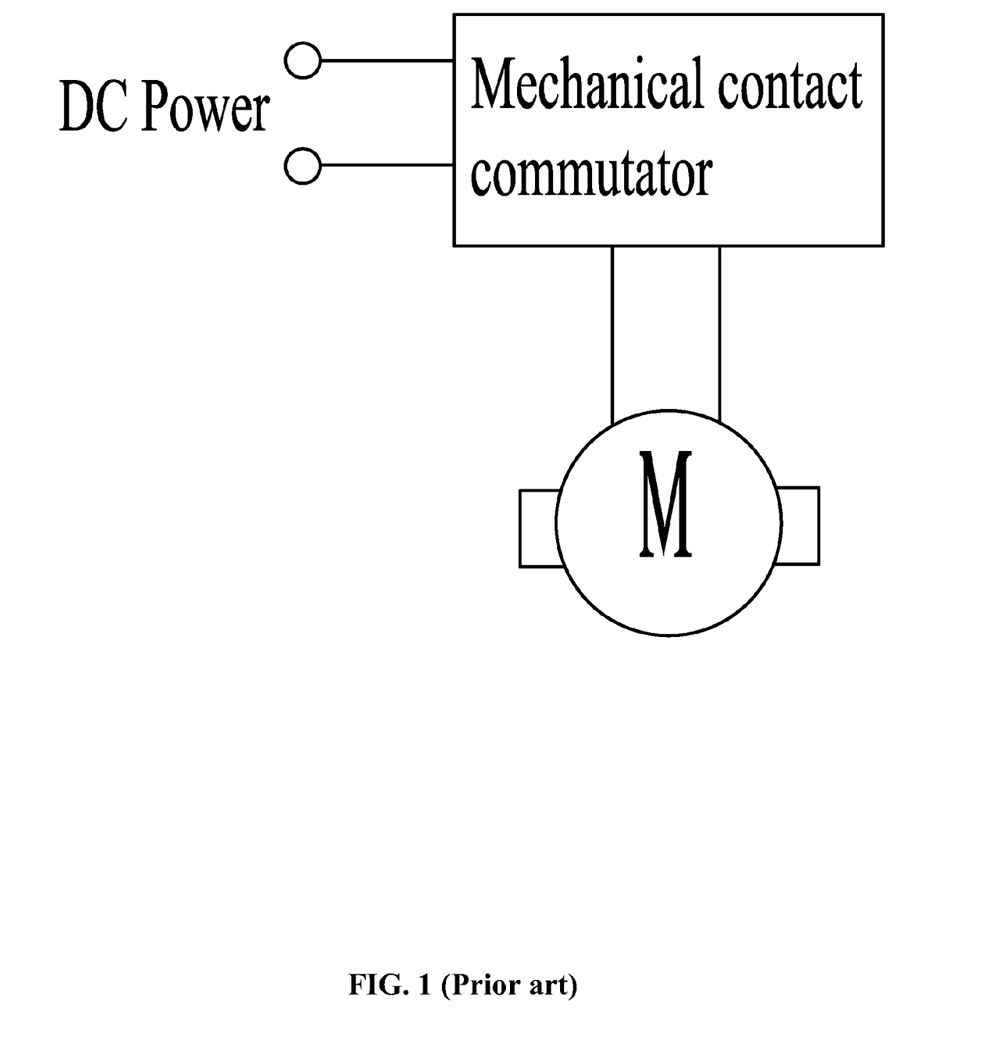
FIG. 1 is a circuit block diagram of a brushed DC motor in the prior art.
Figure 2:
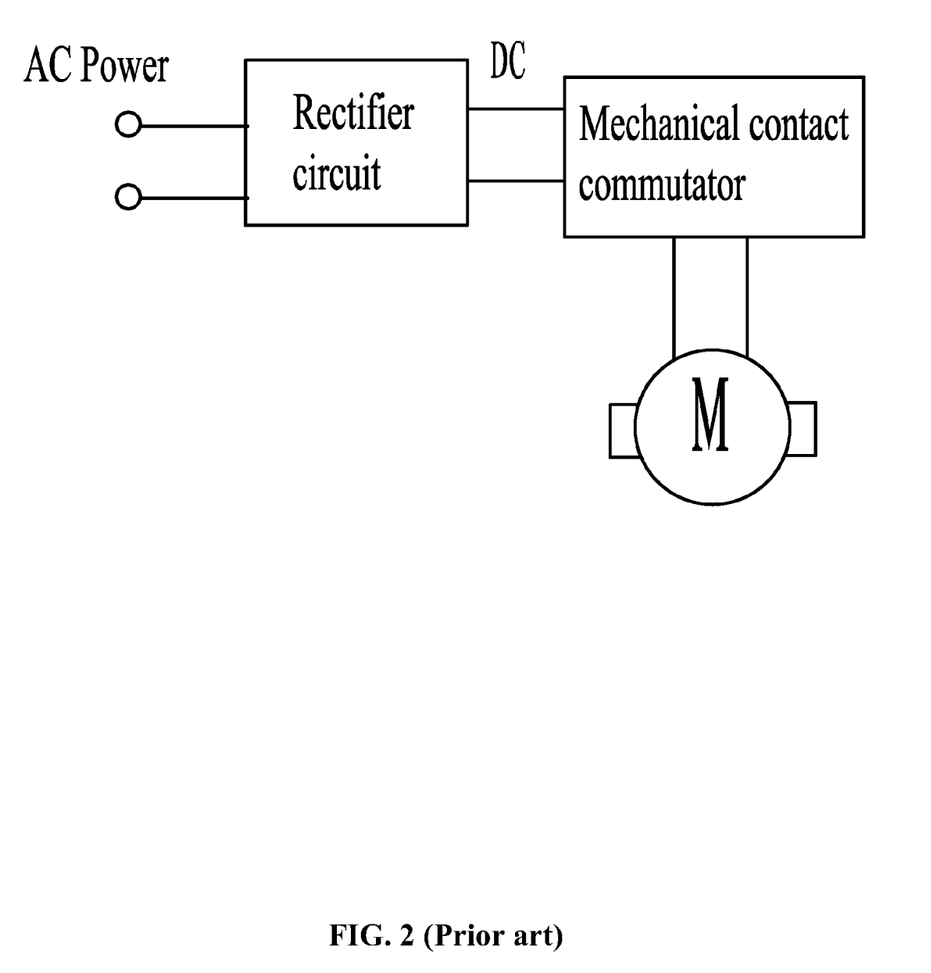
FIG. 2 is a circuit block diagram of another brushed DC motor in the prior art.

Conventionally, there are two control principles for brushed DC motors, one (as shown in FIG. 1) is that a DC power supply directly supplies power to motor windings through a mechanical contact commutator and carbon brushes and the other one (as shown in FIG. 2) is that an AC power supply supplies power to motor windings through the mechanical contact commutator and carbon brushes after the alternating current is converted into the direct current by a rectifier circuit.

The foregoing brushed DC motors are protected in a simple manner. Specifically, the over-current and over-temperature protection are achieved when the temperature of windings becomes too high after heavy current passes through and the heat will be transferred to a temperature controller, which will function to disconnect the power supply circuit. However, in some areas and for some special DC motors, a motor may be burned out before the temperature controller functions due to various factors such as ambient temperature, heat dissipation speed, and short withstand time for heavy current, etc., therefore the protection function fails. For example, when a water pump works under water, where the working environment is favorable for heat dissipation, after heavy current passes through the windings, the temperature controller will not disconnect the circuit because the temperature is not high enough even if the windings become heated, hence the motor will be burned instantly. As a result, the protection circuit has low reliability and poor protection effects.

SUMMARY OF THE INVENTION

In view of the above-described problems, it is one objective of the invention to provide a protection circuit for brushed DC motors, which is characterized in that the protection circuit is more reliable and meanwhile it can provide accurate monitoring as well as fast and effective protection.

To achieve the above objective, in accordance with one embodiment of the invention, there provided is a protection circuit for brushed DC motors, the protection circuit being connected between an AC power supply input and a rectifier circuit, comprising a power supply line, a power supply circuit, an AC detection circuit, a rectifier/filter voltage-stabilizing circuit, a microprocessor, a drive circuit, and a switching unit, wherein the switching unit is connected to the power supply line in series, an input terminal of the power supply circuit is connected with the AC power supply input, an output terminal of the power supply circuit supplies power to the other circuits; the AC detection circuit receives current signals from the power supply line, the current signals are processed by the rectifier/filter voltage-stabilizing circuit and sent to the microprocessor, an output terminal of the microprocessor is connected with an input terminal of the drive circuit, and the drive circuit controls the switching unit to connect or disconnect the power supply circuit.

In a class of this embodiment, an input terminal of the microprocessor is connected with a temperature detection circuit.

In a class of this embodiment, the AC detection circuit comprises a resistance connected to the power supply line in series.

In a class of this embodiment, the switching unit is a solid-state relay.

In accordance with another embodiment of the invention, there provided is a protection circuit for brushed DC motors, the protection circuit being connected to an output terminal of a rectifier circuit or a DC power supply, comprising a power supply line, a power supply circuit, a current detection circuit, a filter voltage-stabilizing circuit, a microprocessor, a drive circuit, and a switching unit, wherein the switching unit is connected to the power supply line in series, an input terminal of the power supply circuit is connected with an output terminal of the rectifier circuit or the DC power supply, an output terminal of the power supply supplies power to the other circuits; the current detection circuit receives current signals from the power supply circuit, the current signals are processed by the filter voltage-stabilizing circuit and sent to the microprocessor, an output terminal of the microprocessor is connected with an input terminal of the drive circuit, and the drive circuit controls the switching unit to connect or disconnect the power supply circuit.

In a class of this embodiment, an input terminal of the microprocessor is connected with a temperature detection circuit. The current detection circuit comprises a resistance connected to the power supply line in series, and the switching unit is a relay.

Advantages of the invention are summarized below: by directly detecting the current of the power supply line and actual working temperature of a motor, the protection circuit of the invention is more reliable and can provide accurate response for fast and effective protection, therefore faults are reduced and the service life of motors prolonged.

DETAILED DESCRIPTION OF THE EMBODIMENTS

Example 1

Figure 3:
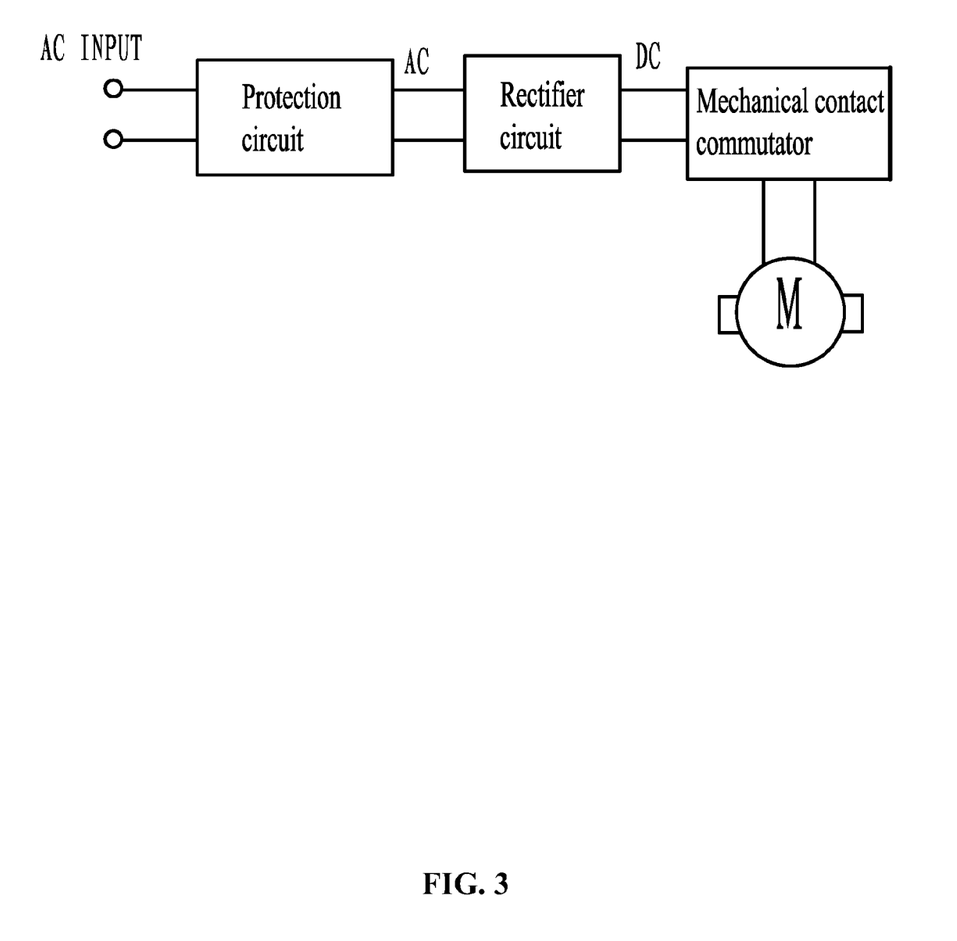
FIG. 3 is an electrical installation diagram in accordance with one embodiment of the invention.
Figure 4:
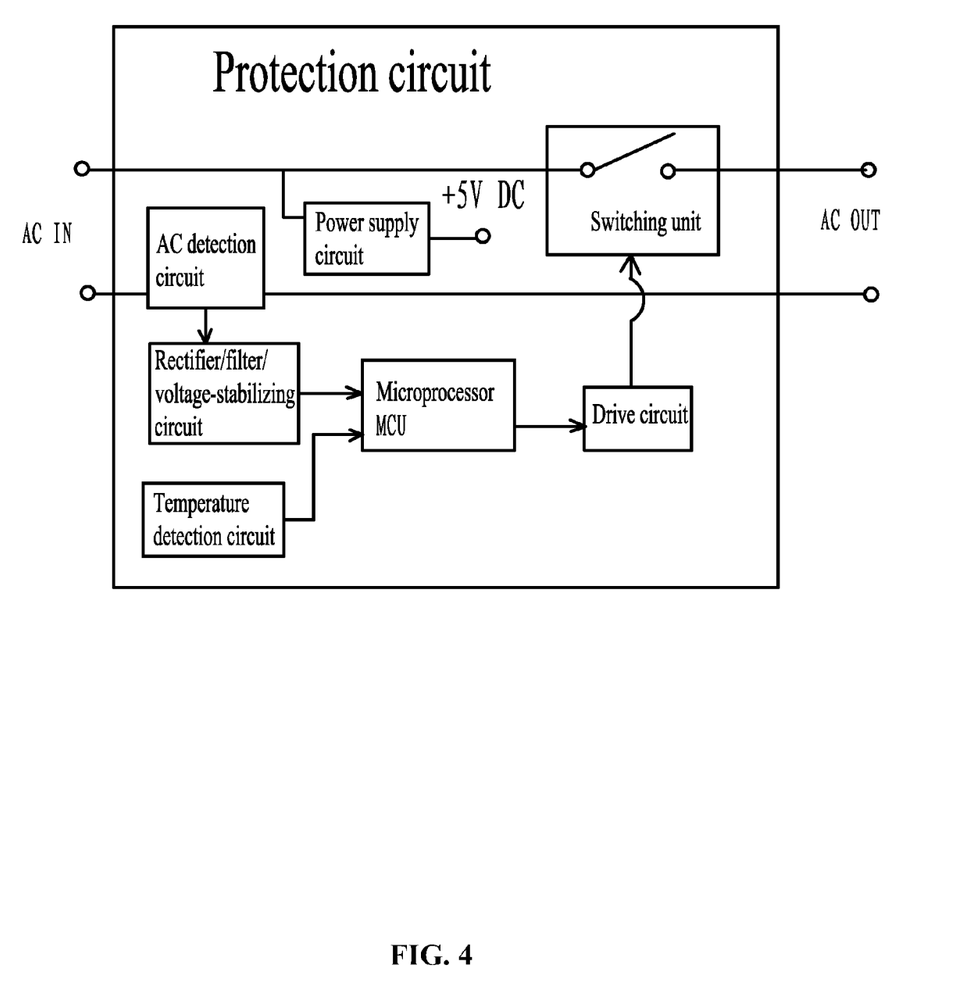
FIG. 4 is a circuit block diagram in accordance with one embodiment of the invention.
Figure 5:
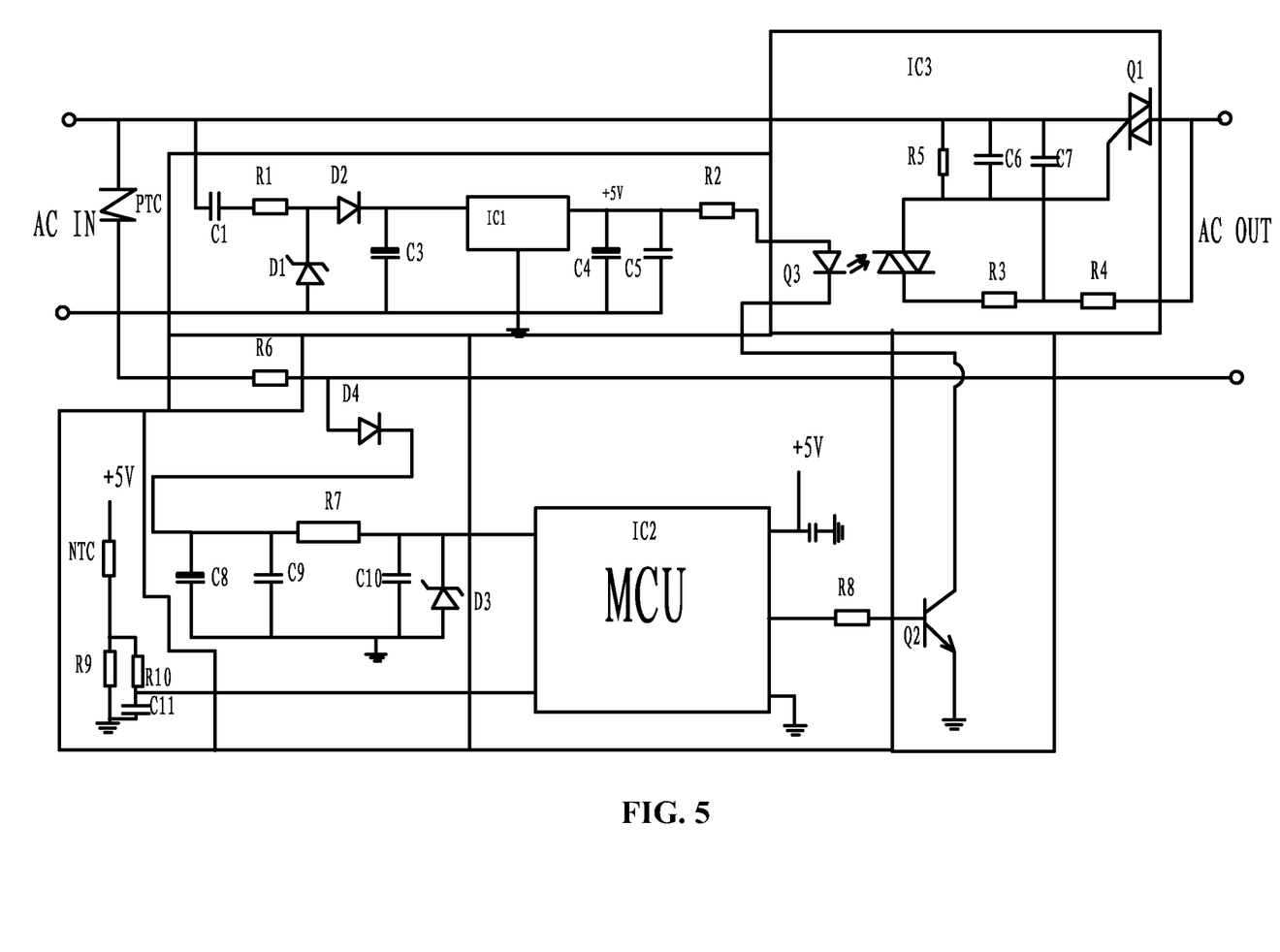
FIG. 5 is a corresponding circuit diagram of FIG. 4.

As shown in FIGS. 3-5, in accordance with the invention, a protection circuit for brushed DC motors, which is connected between an AC power supply input and a rectifier circuit, comprises a power supply line, a power supply circuit, an AC detection circuit, a rectifier/filter voltage-stabilizing circuit, a microprocessor, a drive circuit, and a switching unit. The switching unit is connected to the power supply line in series. An input terminal of the power supply circuit is connected with the AC power supply input, and an output terminal of the power supply circuit supplies power to the other circuits. The AC detection circuit receives current signals from the power supply circuit, such signals are first processed by the rectifier/filter voltage-stabilizing circuit and then sent to the microprocessor. An output terminal of the microprocessor is connected with an input terminal of the drive circuit. The drive circuit controls the switching unit to connect or disconnect the power supply circuit. An input terminal of the microprocessor is connected with a temperature detection circuit. The AC detection circuit comprises a resistance R6, which is connected to the power supply line in series. The switching unit is a solid-state relay. The microprocessor is a chip IC2 and a microcontroller unit (MCU). The power supply circuit comprises a capacitance C1, a resistance R1, a resistance R2, a voltage-stabilizing diode D1, a rectifier diode D2, capacitances C3, C4, C5, and a voltage-stabilizing chip IC1, in which the power supply circuit outputs 5V DC voltage to the other circuits. The rectifier/filter voltage-stabilizing circuit comprises a rectifier diode D4, capacitances C8, C9, C10, a resistance R7, and a voltage-stabilizing diode D3. The drive circuit mainly comprises an audion Q2. The switching unit is an electric solid-state relay IC3 without contacts such as a TLP160G chip, integrated photoelectric coupler Q3, and bidirectional-controlled silicon Q1. Such a relay has obvious advantages compared with ordinary relays having contacts. The temperature detection circuit comprises a thermo-sensitive resistance NTC and a resistance R9, in which the thermo-sensitive resistance NTC and the resistance R9 are connected in series and then connect between the ground and a +5V power supply. A resistance R10 and a capacitance C11 produce filter effects.

The principle in accordance with the example is summarized as follows. The temperature detection circuit detects the actual working temperature of a motor. When the working temperature is higher than the maximum temperature preset in the microprocessor, the microprocessor will output signals to control the drive circuit, which further controls the switching unit to disconnect the power supply circuit to stop the motor. The AC detection circuit detects the operating current of the motor. When the operating current is higher than the maximum current preset in the microprocessor, the microprocessor will output signals to control the drive circuit, which further controls the switching unit to disconnect the power supply circuit to stop the motor. By directly detecting the current of the power supply circuit and the actual working temperature of the motor, the protection circuit of the invention is more reliable and can provide accurate response for fast and effective protection.

Example 2

Figure 6:
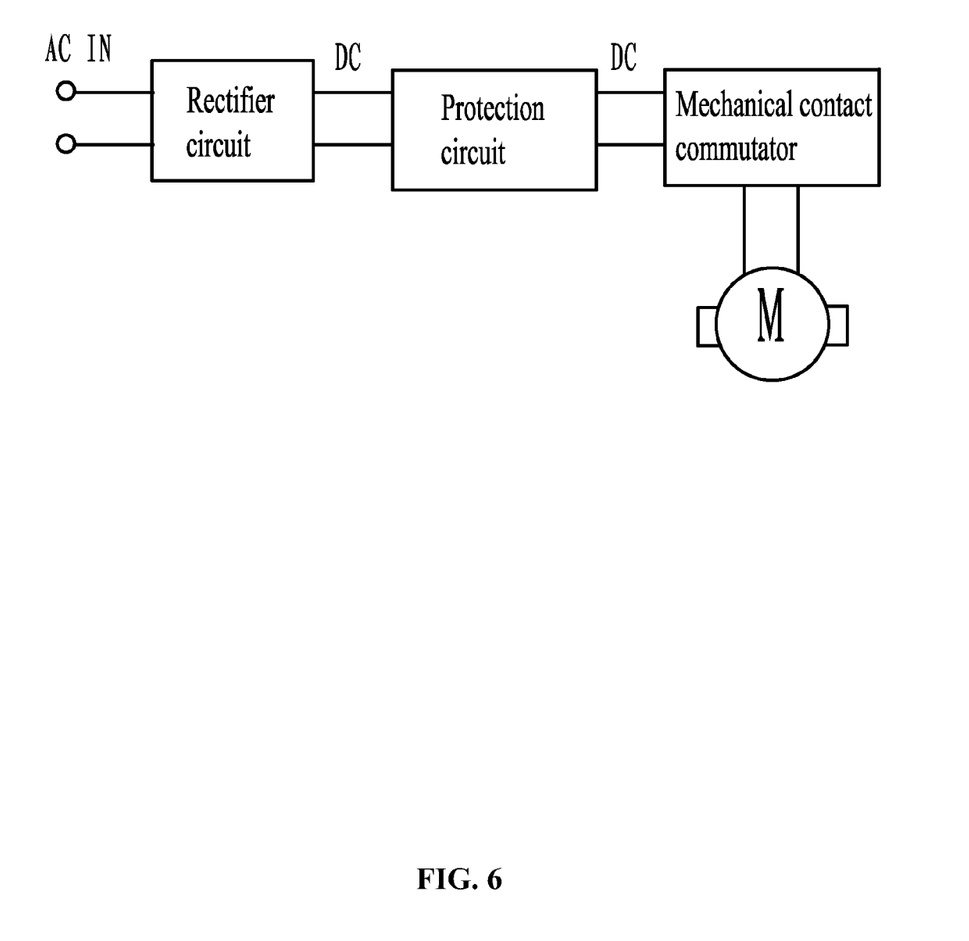
FIG. 6 is an electrical installation diagram in accordance with another embodiment of the invention.
Figure 7:
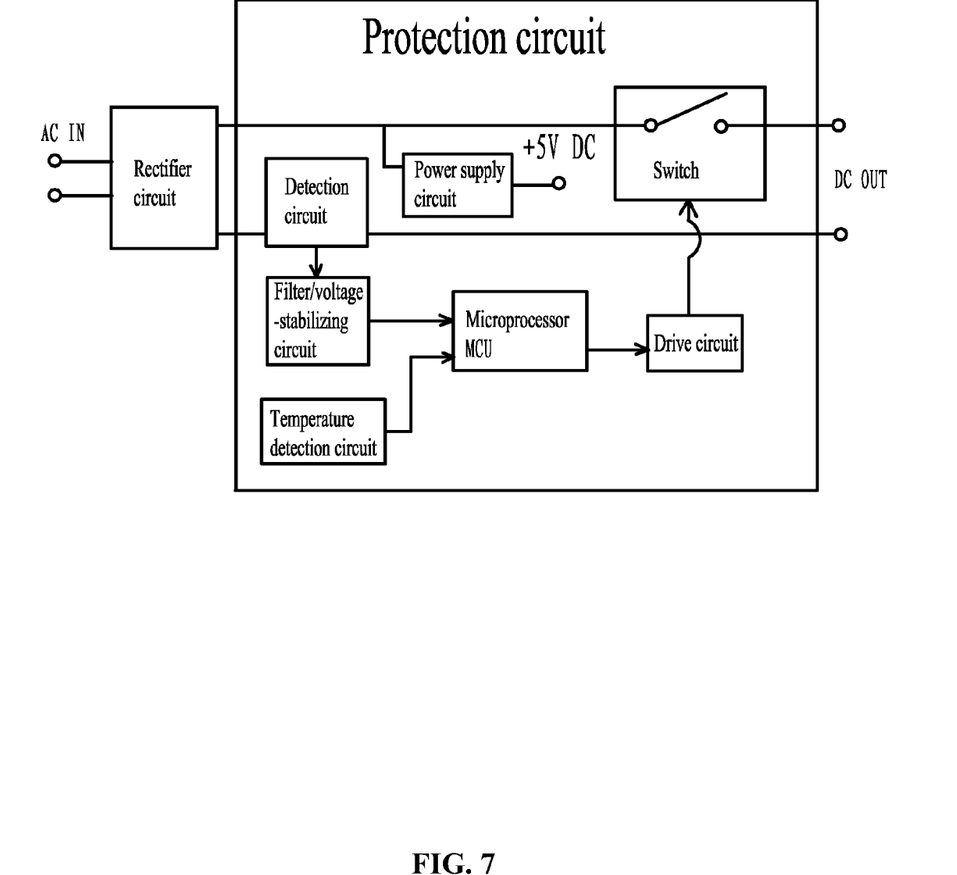
FIG. 7 is a circuit block diagram in accordance with another embodiment of the invention.

As shown in FIGS. 6-7, a protection circuit for brushed DC motors, which is connected either to an output terminal of a rectifier circuit or a DC power supply, comprise a power supply line, a power supply circuit, a current detection circuit, a filter voltage-stabilizing circuit, a microprocessor, a drive circuit, and a switching unit. The switching unit is connected to the power supply line in series. An input terminal of the power supply line is connected with an output terminal of the rectifier circuit or the DC power supply. An output terminal of the power supply supplies power to the other circuits. The current detection circuit receives current signals from the power supply circuit, such signals are firstly processed by the filter/voltage-stabilizing circuit and then sent to the microprocessor, whose output terminal is connected with an input terminal of the drive circuit. The drive circuit controls the switching unit to connect or disconnect the power supply circuit. An input terminal of the microprocessor is connected with a temperature detection circuit. The current detection circuit comprises a resistance, which is connected to the power supply circuit in series, and the switching unit is a relay.

Figure 8:
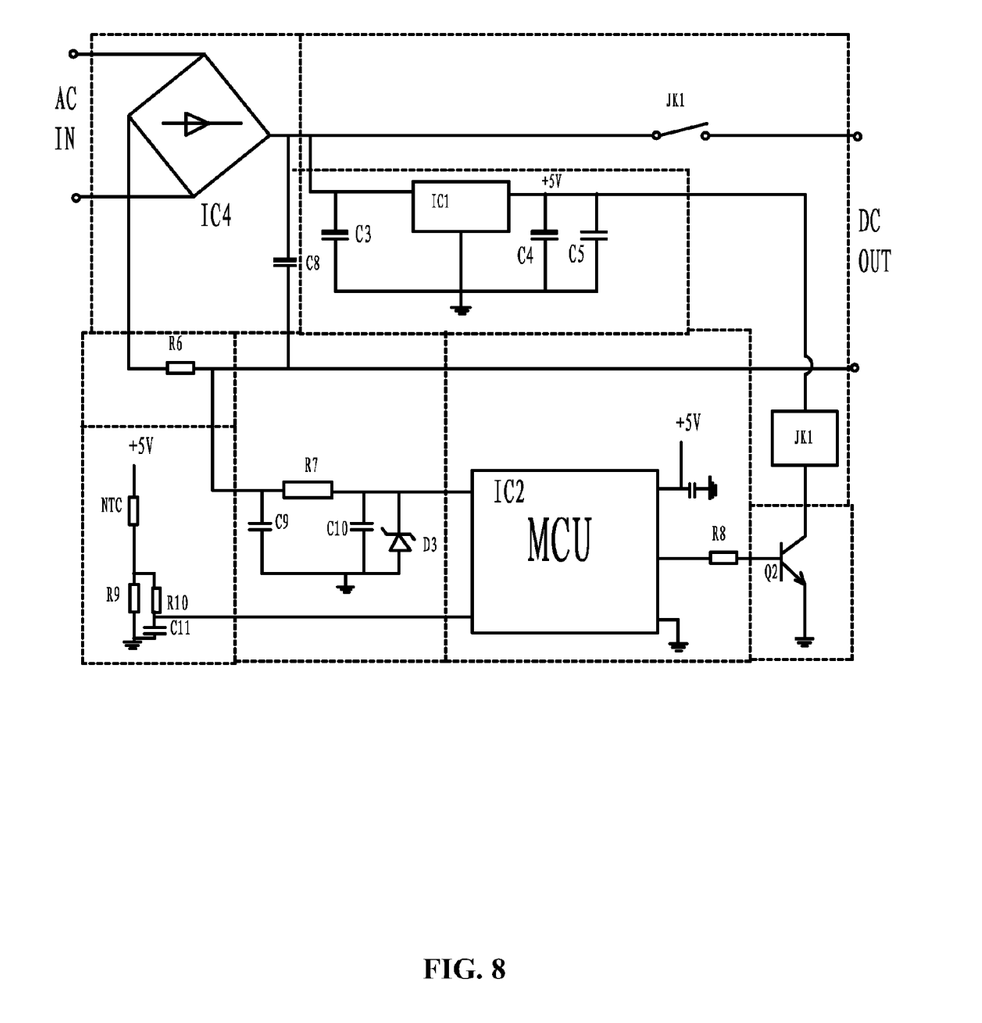
FIG. 8 is a corresponding circuit diagram of FIG. 7.

As show in FIG. 8, the detection circuit comprises a resistance R6, which is connected to the power supply circuit in series. The rectifier circuit is a rectifier diode IC4 and a capacitance C10, the microprocessor is a chip IC2 and a microcontroller unit (MCU). The power supply circuit comprises capacitances C3, C4, C5 and a voltage-stabilizing chip IC1. The temperature detection circuit comprises a thermo-sensitive resistance NTC and a resistance R9, in which the thermo-sensitive resistance NTC and the resistance R9 are connected in series and then connect between the ground and a +5V power supply. A resistance R10 and a capacitance C11 produce filter effects. The filter/voltage-stabilizing circuit comprises capacitances C9 and C10, a resistance R7, and a voltage-stabilizing diode D3. The drive circuit comprises an audion Q2. The switching unit is a mechanical contact relay.

The principle in accordance with the embodiment of the invention is as follows. The temperature detection circuit detects the actual working temperature of a motor. When the working temperature is higher than the maximum temperature preset in the microprocessor, the microprocessor will output signals to control the drive circuit, which further controls the switching unit to disconnect the power supply circuit to stop the motor. The current detection circuit detects the operating current of the motor. When the operating current is higher than the maximum current preset in the microprocessor, the microprocessor will output signals to control the drive circuit, which further controls the switching unit to disconnect the power supply circuit to stop the motor. By directly detecting the current of the power supply circuit and the actual working temperature of the motor, the protection circuit of the invention is more reliable and can provide accurate response for fast and effective protection.

The invention claimed is:

1. A protection circuit for a brushed DC motor, the protection circuit being connected between an AC power supply input and a rectifier circuit, the protection circuit functioning to stop the brushed DC motor under a given condition to protect the brushed DC motor, the protection circuit comprising:
   a) a power supply line;
   b) a power supply circuit,
   c) an AC detection circuit;
   d) a rectifier/filter voltage-stabilizing circuit;
   e) a microprocessor;
   f) a drive circuit;
   g) a switching unit; and
   h) a temperature detection circuit;
wherein:
   the switching unit is connected to the power supply line in series;
   an input terminal of the power supply circuit is connected with the AC power supply input;
   an output terminal of the power supply circuit supplies power to the other circuits;

the AC detection circuit detects a current in the power supply line;
the current is processed by the rectifier/filter voltage-stabilizing circuit and sent to the microprocessor;
an output terminal of the microprocessor is connected with an input terminal of the drive circuit;
the drive circuit controls the switching unit to connect or disconnect the power supply circuit, wherein when the switching unit is disconnected from the power supply circuit, the brushed DC motor stops;
the temperature detection circuit is connected to an input terminal of the microprocessor, and detects a working temperature of the brushed DC motor;
the microprocessor controls the drive circuit to turn off the switching unit to stop the brushed DC motor, and to reduce the current to zero when
   a) the current in the power supply line is above a preset current value; or
   b) the working temperature of the brushed DC motor is above a preset temperature value;
the preset current value is independent from the working temperature of the brushed DC motor; and
the preset current value is independent from the preset temperature value.

2. The protection circuit of claim 1, wherein the AC detection circuit comprises a resistor connected to the power supply line in series.

3. The protection circuit of claim 1, wherein the switching unit is a solid-state relay.

4. A protection circuit for a brushed DC motor, the protection circuit being connected to an output terminal of a rectifier circuit or a DC power supply, the protection circuit functioning to stop the brushed DC motor under a given condition to protect the brushed DC motor, the protection circuit comprising:
   a) a power supply line;
   b) a power supply circuit;
   c) a current detection circuit;
   d) a filter voltage-stabilizing circuit;
   e) a microprocessor;
   f) a drive circuit;
   g) a switching unit; and
   h) a temperature detection circuit;
wherein:
the switching unit is connected to the power supply line in series;
an input terminal of the power supply circuit is connected with an output terminal of the rectifier circuit or the DC power supply;
an output terminal of the power supply supplies power to the other circuits;
the current detection circuit detects a current in the power supply circuit;
the current is processed by the filter voltage-stabilizing circuit and sent to the microprocessor;
an output terminal of the microprocessor is connected with an input terminal of the drive circuit;
the drive circuit controls the switching unit to connect or disconnect the power supply circuit, wherein when the switching unit is disconnected from the power supply circuit, the brushed DC motor stops;
the temperature detection circuit is connected to an input terminal of the microprocessor, and detects a working temperature of the brushed DC motor;
the microprocessor controls the drive circuit to turn off the switching unit to stop the brushed DC motor, and to reduce the current to zero when
   a) the current in the power supply line is above a preset current value; or
   b) the working temperature of the brushed DC motor is above a preset temperature value;
the preset current value is independent from the working temperature of the brushed DC motor; and
the preset current value is independent from the preset temperature value.

5. The protection circuit of claim 4, wherein the AC detection circuit comprises a resistor connected to the power supply line in series.

6. The protection circuit of claim 4, wherein the switching unit is a solid-state relay.

7. A method of using a protection circuit to protect a brushed DC motor from failing, the brushed DC motor being used in a high temperature environment,
wherein:
the protection circuit comprises a power supply line, a power supply circuit, an AC detection circuit, a rectifier/filter voltage-stabilizing circuit, a microprocessor, a drive circuit, a switching unit, and a temperature detection circuit;
the switching unit is connected to the power supply line in series;
an output terminal of the microprocessor is connected to an input terminal of the drive circuit;
the drive circuit controls the switching unit to connect or disconnect the power supply circuit, wherein when the switching unit is disconnected from the power supply circuit, the brushed DC motor stops; and
the temperature detection circuit is connected to an input terminal of the microprocessor;
the method comprising:
connecting the protection circuit between an AC power supply input and a rectifier circuit;
detecting a working current of the brushed DC motor by the AC detection circuit;
detecting a working temperature of the brushed DC motor by the temperature detection circuit;
turning off the switching unit to stop the brushed DC motor and to reduce the working current of the brushed DC motor to zero by the microprocessor when the working current of the brushed DC motor is above a preset current value; and
turning off the switching unit to stop the brushed DC motor and to reduce the working current of the brushed DC motor to zero by the microprocessor when the working temperature of the brushed DC motor is above a preset temperature value;
wherein the preset current value is independent from the working temperature of the brushed DC motor, and the preset current value is independent from the preset temperature value.

* * * * *